(12) United States Patent
Miao et al.

(10) Patent No.: US 12,222,466 B2
(45) Date of Patent: Feb. 11, 2025

(54) OPTICAL IMAGING SYSTEM

(71) Applicant: Zhejiang Sunny Optics Co., Ltd., Yuyao (CN)

(72) Inventors: Lili Miao, Yuyao (CN); Litong Song, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 531 days.

(21) Appl. No.: 17/571,405

(22) Filed: Jan. 7, 2022

(65) Prior Publication Data

US 2022/0308314 A1    Sep. 29, 2022

(30) Foreign Application Priority Data

Mar. 23, 2021 (CN) .......................... 202110307181.2

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ........ G02B 13/004; G02B 9/34; G02B 13/06; G02B 13/18; G02B 13/00
See application file for complete search history.

(56) References Cited

U.S. PATENT DOCUMENTS

| 8,014,080 B1* | 9/2011 | Chen ........................ G02B 9/34 359/650 |
| 2004/0130799 A1* | 7/2004 | Kreitzer ................... G02B 9/10 359/651 |
| 2014/0043700 A1* | 2/2014 | Asami ....................... G02B 9/34 359/753 |
| 2014/0085712 A1 | 3/2014 | Tsai et al. |
| 2016/0116710 A1* | 4/2016 | Liang .................. G02B 13/004 359/715 |

(Continued)

FOREIGN PATENT DOCUMENTS

| CN | 102566013 A | 7/2012 |
| CN | 109239888 A | 1/2019 |

(Continued)

OTHER PUBLICATIONS

Indian Examination report corresponding to Indian Application No. 202214000851, dated Jun. 22, 2022, 9 pages.

*Primary Examiner* — Balram T Parbadia
*Assistant Examiner* — Gabriel A Sanz
(74) *Attorney, Agent, or Firm* — Reising Ethington P.C.

(57) ABSTRACT

The present disclosure discloses an optical imaging system, along an optical axis from an object side to an image side, sequentially includes: a first lens having negative refractive power; a second lens having positive refractive power, and an object-side surface of the second lens being a convex surface; a third lens having refractive power; and a fourth lens having refractive power, and an object-side surface of the fourth lens being a concave surface. A total effective focal length f of the optical imaging system and half of a maximum field-of-view Semi-FOV of the optical imaging system satisfy: f×tan(Semi-FOV)≥4.0 mm; and the total effective focal length f of the optical imaging system and an entrance pupil diameter EPD of the optical imaging system satisfy: f/EPD<2.35.

20 Claims, 8 Drawing Sheets

(56) References Cited

U.S. PATENT DOCUMENTS

| | | | | |
|---|---|---|---|---|
| 2018/0252897 A1* | 9/2018 | Hsueh | ............... | H04N 23/54 |
| 2018/0341085 A1* | 11/2018 | Bone | ............... | G02B 13/0045 |
| 2019/0033559 A1* | 1/2019 | Chang | ............... | G02B 13/18 |
| 2019/0041610 A1* | 2/2019 | Wu | ............... | G02B 13/18 |
| 2020/0249433 A1 | 8/2020 | Lin et al. | | |
| 2021/0080695 A1 | 3/2021 | Tseng et al. | | |

FOREIGN PATENT DOCUMENTS

| | | | |
|---|---|---|---|
| CN | 111751959 | A | 10/2020 |
| JP | H04238312 | A | 8/1992 |
| TW | 201300829 | A | 1/2013 |
| TW | I687733 | B | 3/2020 |

* cited by examiner

OPTICAL IMAGING SYSTEM

CROSS-REFERENCE TO RELATED APPLICATIONS

This application claims the priority from Chinese Patent Application No. 202110307181.2, filed in the National Intellectual Property Administration (CNIPA) on Mar. 23, 2021, the content of which is hereby incorporated by reference in its entirety.

TECHNICAL FIELD

The present disclosure relates to the field of optical elements, and in particular, to an optical imaging system.

BACKGROUND

With the development of the times, the application fields of optical imaging systems are getting wider and wider. At present, optical imaging systems have been widely used in fields such as daily life applications and industrial production. For example, optical imaging systems play an irreplaceable role in fields such as communication, monitoring, and security and protection.

At the same time, in order to meet the large demand for optical imaging systems in daily life applications and industrial production, major lens assembly manufacturers begin to study how to improve the competitiveness and production efficiency of their products by rationally designing technical parameters such as the refractive power and surface type of the lens assembly on the basis of ensuring the imaging quality of the optical imaging systems. For example, how to make breakthroughs in at least one aspect of reducing the difficulty of lens assembly production, improving lens assembly production efficiency, increasing a visual range of the lens assembly, expanding the scope of application of the lens assembly, and improving the reliability of the lens assembly, so as to improve the competitiveness and production efficiency of their own products.

SUMMARY

Embodiments of one aspect of the present disclosure provide an optical imaging system, and the optical imaging system along an optical axis from an object side to an image side sequentially includes: a first lens having negative refractive power; a second lens having positive refractive power, and an object-side surface of the second lens being a convex surface; a third lens having refractive power; and a fourth lens having refractive power, and an object-side surface of the fourth lens being a concave surface. A total effective focal length f of the optical imaging system and half of a maximum field-of-view Semi-FOV of the optical imaging system may satisfy: f×tan(Semi-FOV)≥4.0 mm. The total effective focal length f of the optical imaging system and an entrance pupil diameter EPD of the optical imaging system may satisfy: f/EPD<2.35.

In an embodiment, at least one of the surfaces from an object-side surface of the first lens to an image-side surface of the fourth lens is an aspheric surface.

In an exemplary implementation, a combined focal length f23 of the second lens and the third lens and a combined focal length f123 of the first lens, the second lens and the third lens may satisfy: 1.0≤f23/f123≤2.5.

In an exemplary implementation, an effective focal length f2 of the second lens and a radius of curvature R3 of the object-side surface of the second lens may satisfy: 0.5≤R3/f2≤0.9.

In an exemplary implementation, a center thickness CT1 of the first lens on the optical axis and a center thickness CT2 of the second lens on the optical axis may satisfy: 1.0≤CT2/CT1≤3.7.

In an exemplary implementation, an effective focal length f2 of the second lens and an effective focal length f3 of the third lens may satisfy: 0.5≤f2/f3≤3.5.

In an exemplary implementation, a radius of curvature R5 of an object-side surface of the third lens and an effective focal length f3 of the third lens may satisfy: 1.1≤R5/f3≤4.3.

In an exemplary implementation, a center thickness CT1 of the first lens on the optical axis, a center thickness CT2 of the second lens on the optical axis, a center thickness CT3 of the third lens on the optical axis, a center thickness CT4 of the fourth lens on the optical axis and a spaced interval T12 between the first lens and the second lens on the optical axis may satisfy: 1.2≤(CT1+CT2+T12)/(CT3+CT4)≤3.5.

In an exemplary implementation, a radius of curvature R6 of an image-side surface of the third lens, a radius of curvature R7 of the object-side surface of the fourth lens, and a radius of curvature R8 of an image-side surface of the fourth lens may satisfy: 1.0≤|(R6+R7)/R8|≤5.0.

In an exemplary implementation, an edge thickness ET1 of the first lens and a center thickness CT1 of the first lens on the optical axis may satisfy: 2.2≤ET1/CT1≤3.0.

In an exemplary implementation, an on-axis distance SAG12 from an intersection of an image-side surface of the first lens and the optical axis to a vertex of an effective radius of the image-side surface of the first lens and a center thickness CT1 of the first lens on the optical axis may satisfy: 1.2≤SAG12/CT1≤1.7.

In an exemplary implementation, a sum of center thicknesses ΣCT of the first lens to the fourth lens on the optical axis and a sum of spaced intervals ΣAT of any two adjacent lenses on the optical axis from the first lens to the fourth lens may satisfy: 1.5≤ΣCT/ΣAT≤5.0.

In an exemplary implementation, an effective focal length f1 of the first lens, the effective focal length f2 of the second lens, and the effective focal length f3 of the third lens may satisfy: 2.5≤|(f2+f3)/f1|≤4.0.

In an exemplary implementation, a maximum field-of-view FOV of the optical imaging system may satisfy: 140°≤FOV≤160°.

Embodiments of another aspect of the present disclosure provide an optical imaging system, and the optical imaging system along an optical axis from an object side to an image side sequentially includes: a first lens having negative refractive power; a second lens having positive refractive power, and an object-side surface of the second lens being a convex surface; a third lens having refractive power; and a fourth lens having refractive power, and an object-side surface of the fourth lens being a concave surface. A total effective focal length f of the optical imaging system and half of a maximum field-of-view Semi-FOV of the optical imaging system may satisfy: f×tan(Semi-FOV)≥4.0 mm; and the total effective focal length f of the optical imaging system and an entrance pupil diameter EPD of the optical imaging system may satisfy: f/EPD<2.35.

In an exemplary implementation, the effective focal length f2 of the second lens and a radius of curvature R3 of the object-side surface of the second lens may satisfy: 0.5≤R3/f2≤0.9.

In an exemplary implementation, a center thickness CT1 of the first lens on the optical axis and a center thickness CT2 of the second lens on the optical axis may satisfy: $1.0 \leq CT2/CT1 \leq 0.7$.

In an exemplary implementation, the effective focal length f2 of the second lens and the effective focal length f3 of the third lens may satisfy: $0.5 \leq f2/f3 \leq 3.5$.

In an exemplary implementation, a radius of curvature R5 of the object-side surface of the third lens and the effective focal length f3 of the third lens may satisfy: $1.1 \leq R5/f3 \leq 4.3$.

In an exemplary implementation, a center thickness CT1 of the first lens on the optical axis, a center thickness CT2 of the second lens on the optical axis, a center thickness CT3 of the third lens on the optical axis, a center thickness CT4 of the fourth lens on the optical axis and a spaced interval T12 between the first lens and the second lens on the optical axis may satisfy: $1.2 \leq (CT1+CT2+T12)/(CT3+CT4) \leq 3.5$.

In an exemplary implementation, a radius of curvature R6 of the image-side surface of the third lens, a radius of curvature R7 of the object-side surface of the fourth lens, and a radius of curvature R8 of an image-side surface of the fourth lens may satisfy: $1.0 \leq |(R6+R7)/R8| \leq 5.0$.

In an exemplary implementation, an edge thickness ET1 of the first lens and a center thickness CT1 of the first lens on the optical axis may satisfy: $2.2 \leq ET1/CT1 \leq 3.0$.

In an exemplary implementation, an on-axis distance SAG12 from an intersection of an image-side surface of the first lens and the optical axis to a vertex of an effective radius of the image-side surface of the first lens and a center thickness CT1 of the first lens on the optical axis may satisfy: $1.2 \leq SAG12/CT1 \leq 1.7$.

In an exemplary implementation, a total effective focal length f of the optical imaging system and an entrance pupil diameter EPD of the optical imaging system may satisfy: $f/EPD<2.35$.

In an exemplary implementation, a sum of center thicknesses $\Sigma CT$ of the first lens to the fourth lens on the optical axis and a sum of spaced intervals $\Sigma AT$ of any two adjacent lenses on the optical axis from the first lens to the fourth lens may satisfy: $1.5 \leq \Sigma CT/\Sigma AT \leq 5.0$.

Embodiments of the present disclosure provide an optical imaging system suitable for portable electronic products, having at least one of large field-of-view, low chromatic aberration, simple structure, low cost, miniaturization and good imaging quality by reasonably distributing the refractive power of each lens and optimizing optical parameters.

BRIEF DESCRIPTION OF THE DRAWINGS

By reading detailed description of non-limiting embodiments with reference to the following accompanying drawings, other features, objectives and advantages of the present disclosure will be more apparent.

DETAILED DESCRIPTION OF EMBODIMENTS

Figure 1:
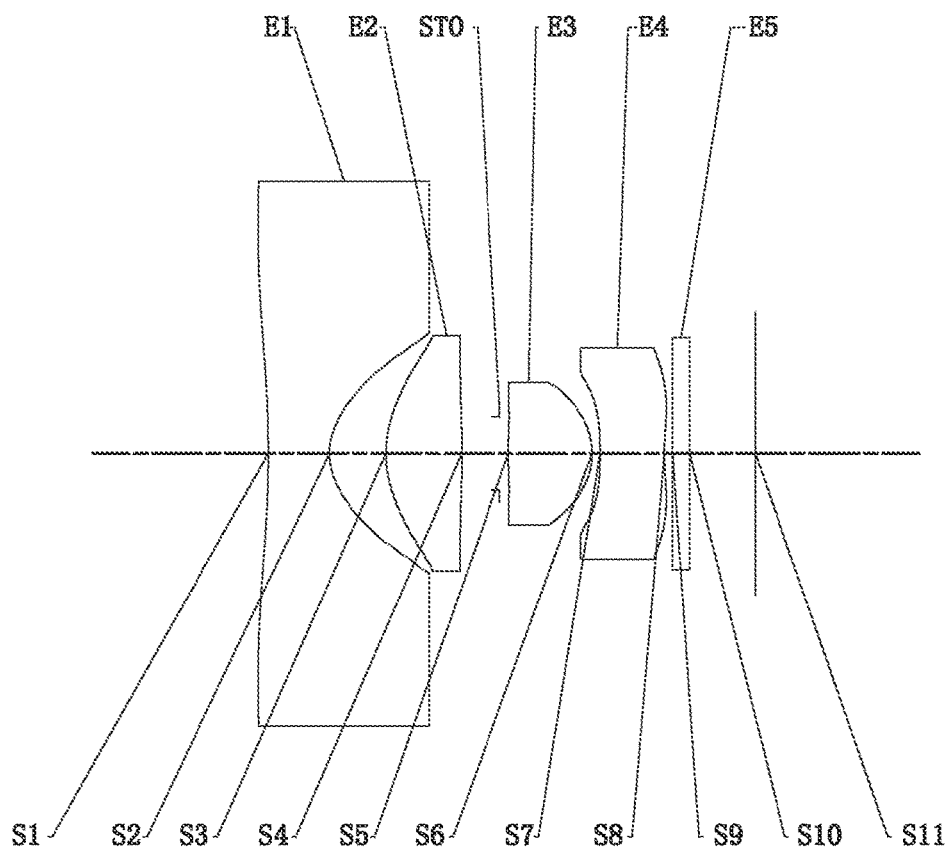
FIG. 1 is a schematic structural diagram illustrating an optical imaging system according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface of the lens, and the surface closest to an imaging plane in each lens is referred to as the image-side surface of the lens.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. Embodiments of the present disclosure will be described below in detail with reference to the accompanying drawings.

The features, principles, and other aspects of the present disclosure are described in detail below.

The optical imaging system according to exemplary implementations of the present disclosure may include four lenses having refractive power, which are a first lens, a second lens, a third lens and a fourth lens, respectively. The four lenses are sequentially arranged from the object side to the image side along the optical axis. There may be a spaced interval in any two adjacent lenses from the first lens to the fourth lens.

In an exemplary implementation, the first lens may have negative refractive power; the second lens may have positive refractive power, and an object-side surface of the second lens may be a convex surface; the third lens may have positive refractive power or negative refractive power; and the fourth lens may have positive refractive power or negative refractive power, and an object-side surface of the fourth lens may be a concave surface. By reasonably distributing the refractive power and surface type characteristics of the first lens to the fourth lens, it is beneficial to reasonably control a total effective focal length of the optical imaging system, and is beneficial to balance and correct various aberrations of the optical imaging system.

In an exemplary implementation, the optical imaging system according to an embodiment of the present disclosure may satisfy: f/EPD<2.35, where f is the total effective focal length of the optical imaging system, and EPD is an entrance pupil diameter of the optical imaging system. More specifically, f and EPD may further satisfy: f/EPD<2.3. Satisfying f/EPD<2.35 is conducive to making the optical imaging system have a reasonable F number, and may effectively control the amount of the light entering the system and the resolution of the system.

In an exemplary implementation, the optical imaging system according to an embodiment of the present disclosure may satisfy: f×tan(Semi-FOV)≥4.0 mm, where f is the total effective focal length of the optical imaging system, and Semi-FOV is half of a maximum field-of-view of the optical imaging system. More specifically, f and Semi-FOV may further satisfy: f×tan(Semi-FOV)≥4.6 mm. Satisfying f×tan(Semi-FOV)≥4.0 mm is beneficial to make the optical imaging system have a reasonable image height, so as to improve the imaging quality of the optical imaging system.

In an exemplary implementation, the optical imaging system according to an embodiment of the present disclosure may satisfy: 0.5≤R3/f2≤0.9, where f2 is an effective focal length of the second lens, and R3 is a radius of curvature of the object-side surface of the second lens. Satisfying 0.5≤R3/f2≤0.9 is beneficial to control the surface type and the effective focal length of the second lens, and is beneficial to balance an axial chromatic aberration.

In an exemplary implementation, the optical imaging system according to an embodiment of the present disclosure may satisfy: 1.0≤CT2/CT1≤3.7, where CT1 is a center thickness of the first lens on the optical axis, and CT2 is a center thickness of the second lens on the optical axis. Satisfying 1.0≤CT2/CT1≤3.7 helps to balance a field curvature of an off-axis field-of-view, and also helps to meet the requirements for processing and production.

In an exemplary implementation, the optical imaging system according to an embodiment of the present disclosure may satisfy: 0.5≤f2/f3≤3.5, where f2 is an effective focal length of the second lens, and f3 is an effective focal length of the third lens. More specifically, f2 and f3 may further satisfy: 0.7≤f2/f3≤3.5. Satisfying 0.5≤f2/f3≤3.5 is beneficial for the second lens and the third lens to correct the astigmatism in the tangential and sagittal directions.

In an exemplary implementation, the optical imaging system according to an embodiment of the present disclosure may satisfy: 1.1≤R5/f3≤4.3, where R5 is a radius of curvature of an object-side surface of the third lens, and f3 is an effective focal length of the third lens. More specifically, R5 and f3 may further satisfy: 1.2≤R5/f3≤4.2. Satisfying 1.1≤R5/f3≤4.3 is not only conducive to controlling the surface type and the effective focal length of the third lens, but also conducive to balancing the axial chromatic aberration.

In an exemplary implementation, the optical imaging system according to an embodiment of the present disclosure may satisfy: 1.2≤(CT1+CT2+T12)/(CT3+CT4)≤3.5, where CT1 is a center thickness of the first lens on the optical axis, CT2 is a center thickness of the second lens on the optical axis, CT3 is a center thickness of the third lens on the optical axis, CT4 is a center thickness of the fourth lens on the optical axis and T12 is a spaced interval between the first lens and the second lens on the optical axis. More specifically, CT1, CT2, T12, CT3 and CT4 may further satisfy: 1.2≤(CT1+CT2+T12)/(CT3+CT4)≤3.4. Satisfying 1.2≤(CT1+CT2+T12)/(CT3+CT4)≤3.5 not only helps to ensure the processability of the system, but also helps the system balance and correct a vertical chromatic aberration and the axial chromatic aberration.

In an exemplary implementation, the optical imaging system according to an embodiment of the present disclosure may satisfy: 1.0≤|(R6+R7)/R8|≤5.0, where R6 is a radius of curvature of an image-side surface of the third lens, R7 is a radius of curvature of the object-side surface of the fourth lens, and R8 is a radius of curvature of an image-side surface of the fourth lens. More specifically, R6, R7 and R8 may further satisfy: 1.2≤|(R6+R7)/R8|≤4.9. Satisfying 1.0≤|(R6+R7)/R8|≤5.0 is not only conducive to reasonably controlling the surface types of the third lens and the fourth lens, correcting the field curvature of the off-axis field-of-view, but also conducive to making the third lens and the fourth lens satisfy processing requirements.

In an exemplary implementation, the optical imaging system according to an embodiment of the present disclosure may satisfy: 2.2≤ET1/CT1≤3.0, where ET1 is an edge thickness of the first lens, and CT1 is a center thickness of the first lens on the optical axis. More specifically, ET1 and CT1 may further satisfy: 2.2≤ET1/CT1≤2.9. Satisfying 2.2≤ET1/CT1≤3.0, while ensuring the processing and production of the first lens, the first lens may effectively balance an off-axis field curvature.

In an exemplary implementation, the optical imaging system according to an embodiment of the present disclosure may satisfy: 1.0≤f23/f123≤2.5, where f23 is a combined focal length of the second lens and the third lens, and f123 is a combined focal length of the first lens, the second lens and the third lens. More specifically, f23 and f123 may further satisfy: 1.1≤f23/f123≤2.3. Satisfying 1.0≤f23/f123≤2.5 is beneficial to correct the astigmatism in the tangential and sagittal directions due to a large field-of-view of the system.

In an exemplary implementation, the optical imaging system according to an embodiment of the present disclosure may satisfy: 1.2≤SAG12/CT1≤1.7, where SAG12 is an on-axis distance from an intersection of an image-side surface of the first lens and the optical axis to a vertex of an effective radius of the image-side surface of the first lens, and CT1 is a center thickness of the first lens on the optical axis. Satisfying 1.2≤SAG12/CT1≤1.7 not only may make the first lens meet the requirements for processing and production, but also may improve the imaging quality of the system.

In an exemplary implementation, the optical imaging system according to an embodiment of the present disclosure may satisfy: 1.5≤ΣCT/ΣAT≤5.0, where ΣCT is a sum of center thicknesses of the first lens to the fourth lens on the optical axis, and ΣAT is a sum of spaced intervals of any two adjacent lenses on the optical axis from the first lens to the fourth lens. Satisfying 1.5≤ΣCT/ΣAT≤5.0 is not only conducive to reasonably distributing the spaced intervals between the lenses and the center thickness of each lens in the system, but also conducive to the system to balance various aberrations and reduce the influence of ghost images.

In an exemplary implementation, the optical imaging system according to an embodiment of the present disclosure may satisfy: 2.5≤|(f2+f3)/f1|≤4.0, where f1 is an effective focal length of the first lens, f2 is the effective focal length of the second lens, and f3 is the effective focal length of the third lens. More specifically, f2, f3 and f1 may further satisfy: 2.5≤|(f2+f3)/f1|≤3.4. Satisfying 2.5≤|(f2+f3)/f1|≤4.0 is beneficial to correct the axial chromatic aberration of the system and improve the optical performance of the system.

In an exemplary implementation, the optical imaging system according to an embodiment of the present disclosure may satisfy: 140°≤FOV≤160°, where FOV is a maximum field-of-view of the optical imaging system. More specifically, FOV may further satisfy: 146°≤FOV≤152°. Satisfying 140°≤FOV≤160° may make an equivalent focal length of the system small, which is helpful for the system to meet the needs of large wide-angle, and at the same time, it is conducive to increasing a clear range and appeal of the imaging picture of the system.

In an exemplary implementation, the optical imaging system according to an embodiment of the present disclosure further includes a stop arranged between the second lens and the third lens. Alternatively, the optical imaging system may further include an optical filter used to correct color deviation and/or a protective glass used to protect a photosensitive element on the imaging plane. Embodiments of the present disclosure proposes an optical imaging system having characteristics such as large field-of-view, low chromatic aberration, low cost, simple structure, miniaturization, wide application range and high imaging quality. Alternatively, the optical imaging system proposed by embodiments of the present disclosure has simple structure and low cost, which may reduce the production difficulty of the system and improve the production efficiency. At the same time, the optical imaging system has a large field-of-view, which may effectively increase the visual range of the system, is beneficial to improve the utilization rate of the system to a certain extent and expand the application range of the system. On the other hand, the optical imaging system provided by embodiments of the present disclosure may have low chromatic aberration, may effectively improve the image quality, ensure a true recording of actual scenarios, and improve the reliability of the system. The optical imaging system according to the above implementations of the present disclosure may employ a plurality of lenses, such as four lenses as described above. By reasonably distributing the refractive power of each lens, the surface type, the center thickness of each lens and the spaced intervals along the optical axis between the lenses, it may effectively converge incident light, reduce the total track length of the imaging system and improve the processability of the imaging system, making the optical imaging system more conducive to production and processing.

In the implementations of the present disclosure, at least one of the surfaces of the lenses is an aspheric surface, that is, at least one of the surfaces from the object-side surface of the first lens to an image-side surface of the fourth lens is an aspheric surface. The characteristic of the aspheric lens is: the curvature is continuously changing from the center of the lens to the periphery of the lens. Unlike the spherical lens with a constant curvature from the center of the lens to the periphery of the lens, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens and the fourth lens is an aspheric surface. Alternatively, both of the object-side surface and the image-side surface of each of the first lens, the second lens, the third lens and the fourth lens are aspheric surfaces.

However, it should be understood by those skilled in the art that the various results and advantages described in the present specification may be obtained by changing the number of the lenses constituting the optical imaging system without departing from the technical solution described in embodiments of the present disclosure. For example, although the optical imaging system having four lenses is described as an example in the implementations, the optical imaging system is not limited to include four lenses. If desired, the optical imaging system may also include other numbers of lenses.

Specific examples of the optical imaging system that may be applied to the above implementations are further described below with reference to the accompanying drawings.

Example 1

An optical imaging system according to Example 1 of the present disclosure is described below with reference to FIGS. 1-2C. FIG. 1 is a schematic structural diagram illustrating the optical imaging system according to Example 1 of the present disclosure.

As shown in FIG. 1, the optical imaging system from an object side to an image side sequentially includes: a first lens E1, a second lens E2, a stop STO, a third lens E3, a fourth lens E4, an optical filter E5 and an imaging plane S11.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the surfaces S1 to S10 and is finally imaged on the imaging plane S11.

Table 1 is a table illustrating basic parameters of the optical imaging system of Example 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −15.1188 | 0.7530 | 1.55 | 56.1 | −1.39 | −23.6156 |
| S2 | Aspheric | 0.8150 | 0.6925 | | | | −1.5634 |
| S3 | Aspheric | 1.3924 | 0.9341 | 1.64 | 23.3 | 2.04 | −0.5000 |
| S4 | Aspheric | −16.3017 | 0.4716 | | | | −95.0000 |
| STO | Spherical | infinite | 0.1061 | | | | |
| S5 | Aspheric | 6.1529 | 1.0306 | 1.67 | 20.4 | 1.50 | 94.9998 |
| S6 | Aspheric | −0.8868 | 0.1000 | | | | −0.4934 |
| S7 | Aspheric | −9.5411 | 0.7914 | 1.67 | 20.4 | −3.60 | 43.9834 |
| S8 | Aspheric | 3.3023 | 0.1007 | | | | −95.0000 |
| S9 | Spherical | infinite | 0.2100 | 1.51 | 64.2 | | |
| S10 | Spherical | infinite | 0.8099 | | | | |
| S11 | Spherical | infinite | | | | | |

In this example, the total effective focal length f of the optical imaging system is 1.30 mm, a total track length TTL of the optical imaging system (that is, a distance from the object-side surface S1 of the first lens E1 to the imaging plane S11 of the optical imaging system on the optical axis) is 6.00 mm, half of a diagonal length ImgH of an effective pixel area on the imaging plane S11 of the optical imaging system is 1.75 mm, half of a maximum field-of-view Semi-FOV of the optical imaging system is 75.04°, and an F number Fno of the optical imaging system is 2.20.

In Example 1, the object-side surface and the image-side surface of any one of the first lens E1 to the fourth lens E4 are aspheric. The surface type x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is the reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$ and $A_{16}$ applicable to each aspheric surface S1 to S8 in Example 1.

Figures 2A, 2B:
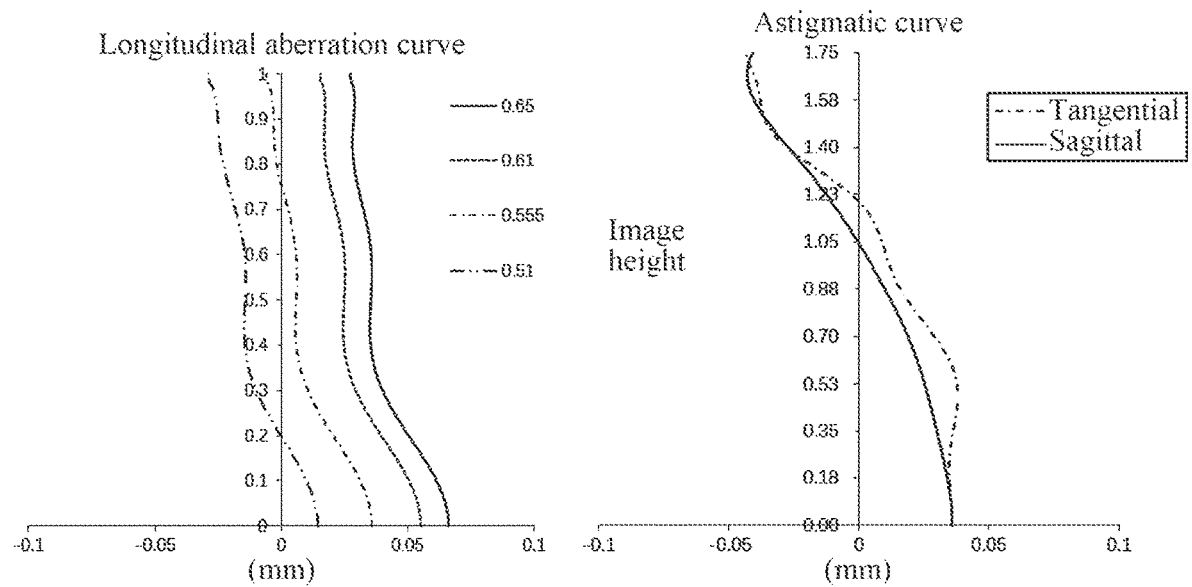
FIGS. 2A-2C respectively illustrate a longitudinal aberration curve, an astigmatic curve and a lateral color curve of the optical imaging system according to Example 1.
Figure 2C:
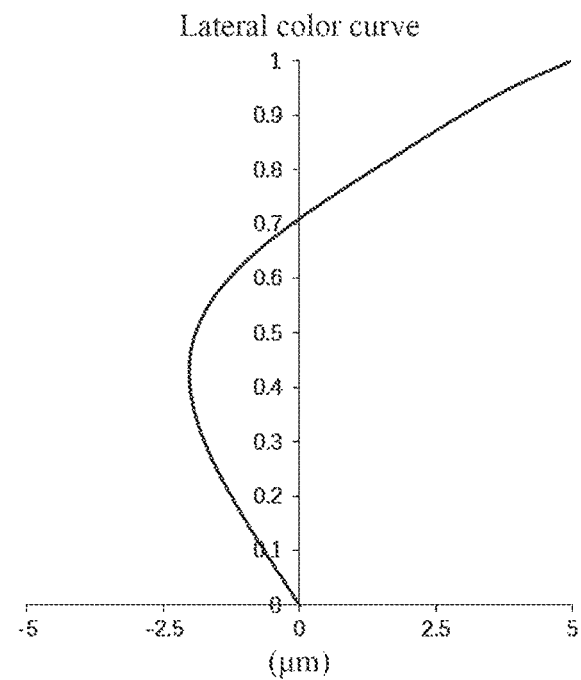

FIG. 2A illustrates the longitudinal aberration curve of the optical imaging system according to Example 1, representing deviations of focal points converged by light of different wavelengths after passing through the lens assembly. FIG. 2B illustrates the astigmatic curve of the optical imaging system according to Example 1, representing a curvature of a tangential plane and a curvature of a sagittal plane. FIG. 2C illustrates the lateral color curve of the optical imaging system according to Example 1, representing deviations of different image heights on an imaging plane after light passes through the lens assembly. It can be seen from FIG. 2A to FIG. 2C that the optical imaging system provided in Example 1 can achieve good imaging quality.

Example 2

Figure 3:
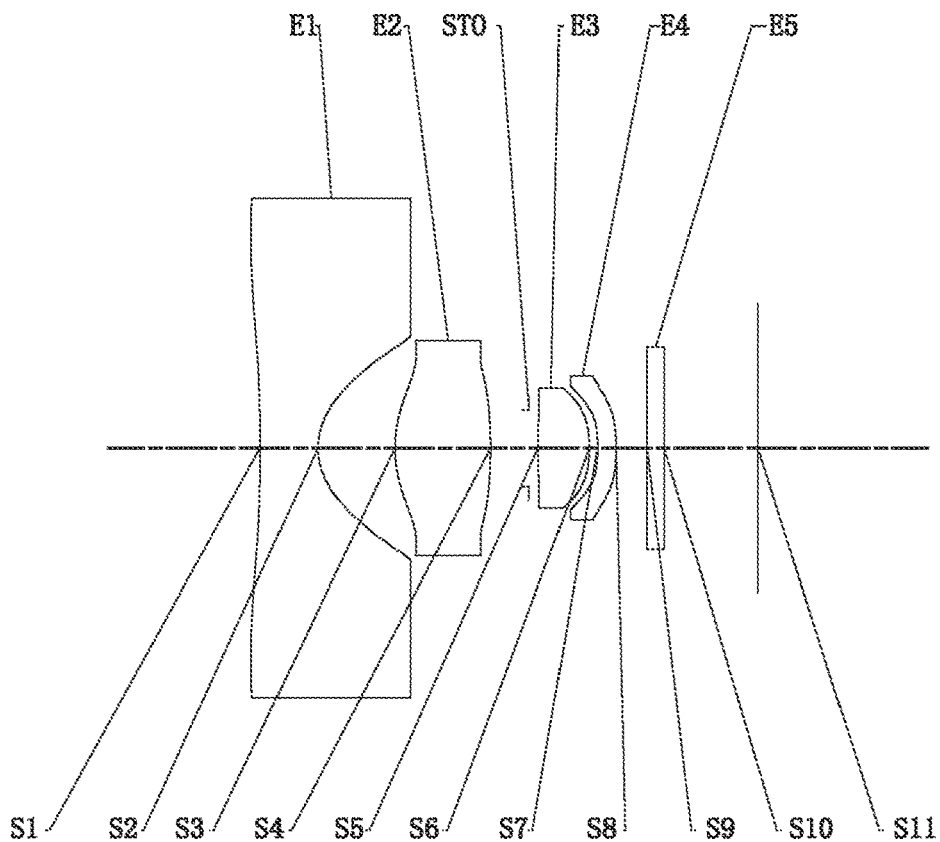
FIG. 3 is a schematic structural diagram illustrating an optical imaging system according to Example 2 of the present disclosure.

An optical imaging system according to Example 2 of the present disclosure is described below with reference to FIGS. 3-4C. In this example and the following examples, for the purpose of brevity, the description of parts similar to those in Example 1 will be omitted. FIG. 3 is a schematic structural diagram illustrating the optical imaging system according to Example 2 of the present disclosure.

As shown in FIG. 3, the optical imaging system from an object side to an image side sequentially includes: a first lens E1, a second lens E2, a stop STO, a third lens E3, a fourth lens E4, an optical filter E5 and an imaging plane S11.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an

TABLE 2

| Surface number | A4 | A6 | A8 | A10 | A12 | A14 | A16 |
|---|---|---|---|---|---|---|---|
| S1 | −6.2205E−03 | 4.4965E−03 | −1.1348E−03 | 1.5950E−04 | −1.3033E−05 | 5.7750E−07 | −1.0692E−08 |
| S2 | 1.0714E−01 | −1.6876E−01 | 2.3633E−01 | −2.1229E−01 | 1.3678E−01 | −5.1885E−02 | 7.9015E−03 |
| S3 | −6.6948E−02 | −1.8900E−02 | −4.5769E−02 | 1.4363E−01 | −1.2138E−01 | 4.2423E−02 | −5.4446E−03 |
| S4 | −1.4131E−02 | 3.4624E−02 | 4.4204E−02 | −1.3877E−01 | 1.2989E−01 | −5.4802E−02 | 8.7474E−03 |
| S5 | 8.7377E−02 | −6.1805E+00 | 6.3420E+01 | −3.7644E+02 | 1.2399E+03 | −2.1343E+03 | 1.4889E+03 |
| S6 | −3.0248E−01 | 1.6075E+00 | −3.7110E+00 | 3.7144E+00 | 4.3471E−01 | −4.4304E+00 | 2.7991E+00 |
| S7 | −6.0198E−01 | 1.6316E+00 | −3.6992E+00 | 5.6569E+00 | −5.8275E+00 | 3.6452E+00 | −9.8042E−01 |
| S8 | −1.0694E−01 | −1.2093E−01 | 3.5529E−01 | −4.3669E−01 | 2.9568E−01 | −1.0670E−01 | 1.6408E−02 | object-side surface S5 of the third lens is a convex surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The optical filter E5 has an object-side surface S9 and an image-side surface S10. Light from an object sequentially passes through the surfaces S1 to S10 and is finally imaged on the imaging plane S11.

In this example, the total effective focal length f of the optical imaging system is 1.30 mm, a total track length TTL of the optical imaging system is 6.18 mm, half of a diagonal length ImgH of an effective pixel area on the imaging plane S11 of the optical imaging system is 1.75 mm, half of a maximum field-of-view Semi-FOV of the optical imaging system is 74.82°, and an F number Fno of the optical imaging system is 2.22.

Table 3 is a table illustrating basic parameters of the optical imaging system of Example 2, where the units for the radius of curvature, the thickness/distance and the focal length are millimeter (mm). Table 4 shows high-order coefficients applicable to each aspheric surface in Example 2, where the surface type of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −34.7973 | 0.7141 | 1.55 | 56.1 | −1.49 | 28.4215 |
| S2 | Aspheric | 0.8388 | 0.9583 | | | | −1.2572 |
| S3 | Aspheric | 1.6107 | 1.1893 | 1.64 | 23.3 | 2.12 | −0.8016 |
| S4 | Aspheric | −6.2713 | 0.4714 | | | | −94.9620 |
| STO | Spherical | infinite | 0.1177 | | | | |
| S5 | Aspheric | 6.5055 | 0.6335 | 1.67 | 20.4 | 2.73 | 94.7427 |
| S6 | Aspheric | −1.8707 | 0.1000 | | | | 4.0451 |
| S7 | Aspheric | −3.7764 | 0.2300 | 1.67 | 20.4 | 17.34 | −36.1301 |
| S8 | Aspheric | −2.9148 | 0.3869 | | | | −94.8225 |
| S9 | Spherical | infinite | 0.2100 | 1.51 | 64.2 | | |
| S10 | Spherical | infinite | 1.1666 | | | | |
| S11 | Spherical | infinite | | | | | |

TABLE 4

| Surface number | A4 | A6 | A8 | A10 | A12 | A14 | A16 |
|---|---|---|---|---|---|---|---|
| S1 | −1.5254E−02 | 7.2610E−03 | −1.6797E−03 | 2.3949E−04 | −2.0997E−05 | 1.0376E−06 | −2.2117E−08 |
| S2 | 1.1394E−01 | −1.6830E−01 | 2.4168E−01 | −2.1533E−01 | 1.2609E−01 | −4.5633E−02 | 7.1645E−03 |
| S3 | −1.6209E−01 | −1.0684E−01 | 1.6166E−01 | −2.1523E−01 | 1.3370E−01 | −3.5761E−02 | 3.3301E−03 |
| S4 | −5.8938E−02 | −4.2871E−02 | 6.6741E−02 | 1.9381E−02 | −9.2703E−02 | 6.9796E−02 | −1.5608E−02 |
| S5 | −1.0688E−01 | −4.9342E−02 | −4.3014E+00 | 3.7310E+01 | −1.6260E+02 | 3.3804E+02 | −2.7686E+02 |
| S6 | −9.6036E−01 | 2.1908E+00 | −3.3346E+00 | 2.8454E−01 | 1.1877E+01 | −2.1554E+01 | 1.2847E+01 |
| S7 | −1.5823E+00 | 1.2801E+00 | −3.3012E−01 | 3.5330E+00 | −8.6261E+00 | 9.7167E+00 | −4.6964E+00 |
| S8 | −1.0213E+00 | 1.8897E+00 | −4.3031E+00 | 9.5107E+00 | −1.2797E+01 | 9.2192E+00 | −2.7449E+00 |

Figures 4A, 4B:
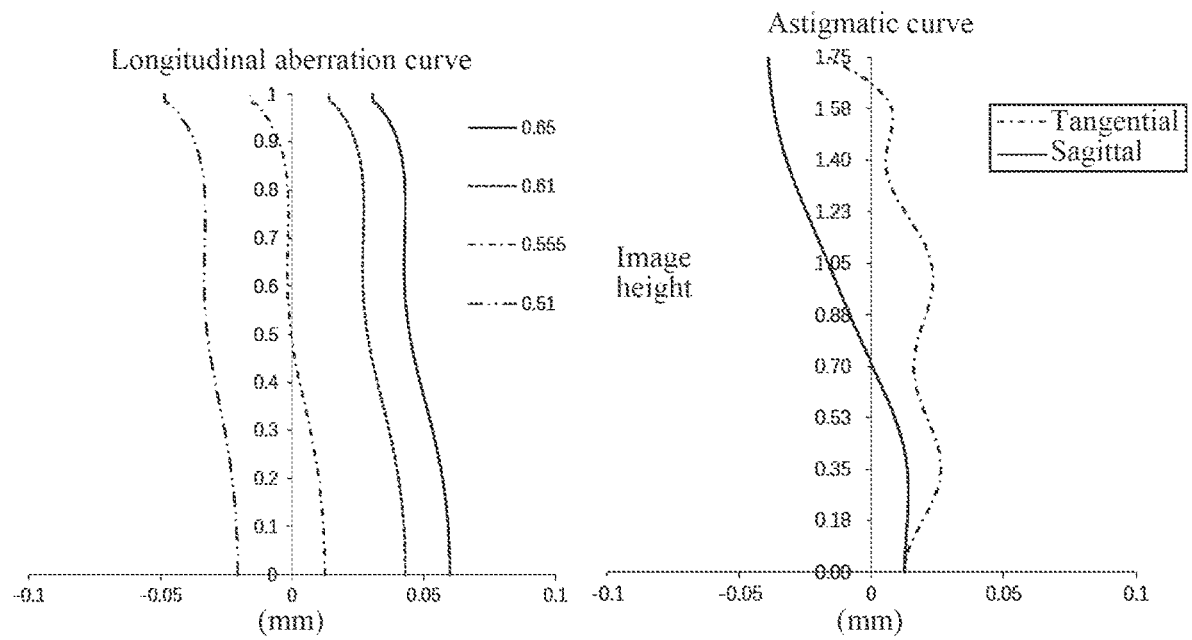
FIGS. 4A-4C respectively illustrate a longitudinal aberration curve, an astigmatic curve and a lateral color curve of the optical imaging system according to Example 2.
Figure 4C:
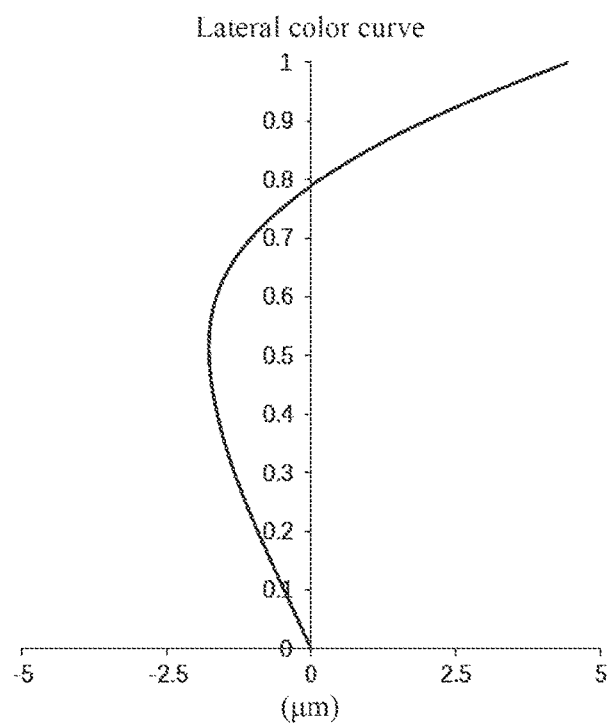

FIG. 4A illustrates the longitudinal aberration curve of the optical imaging system according to Example 2, representing deviations of focal points converged by light of different wavelengths after passing through the lens assembly. FIG. 4B illustrates the astigmatic curve of the optical imaging system according to Example 2, representing a curvature of a tangential plane and a curvature of a sagittal plane. FIG. 4C illustrates the lateral color curve of the optical imaging system according to Example 2, representing deviations of different image heights on an imaging plane after light passes through the lens assembly. It can be seen from FIG. 4A to FIG. 4C that the optical imaging system provided in Example 2 can achieve good imaging quality.

Example 3

Figure 5:
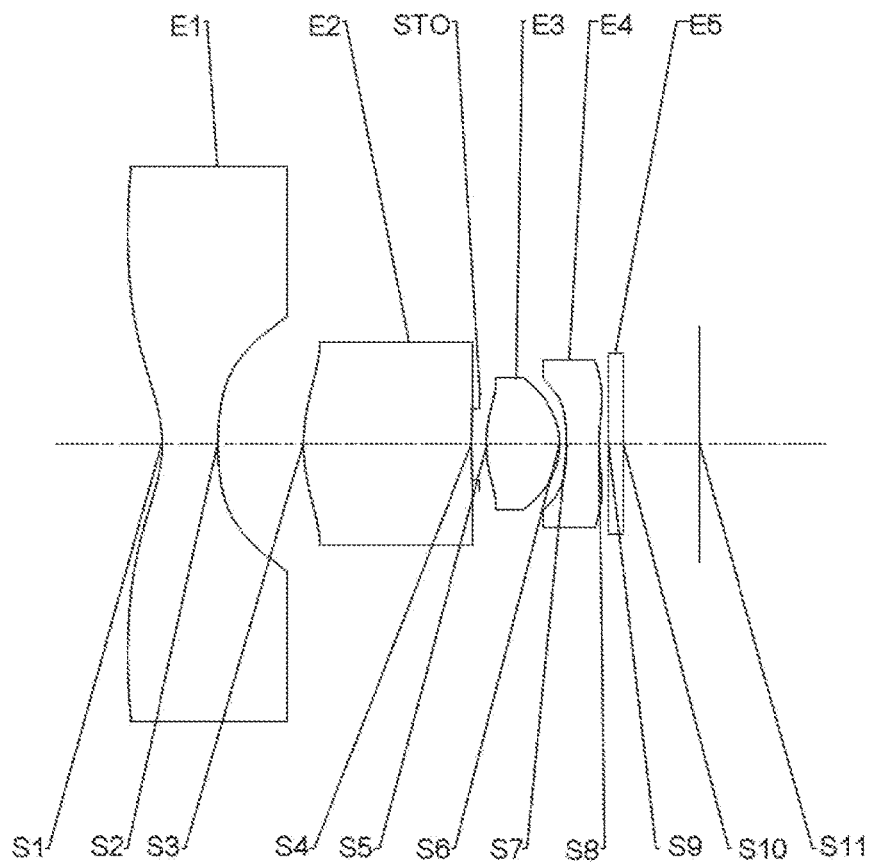
FIG. 5 is a schematic structural diagram illustrating an optical imaging system according to Example 3 of the present disclosure.

An optical imaging system according to Example 3 of the present disclosure is described below with reference to FIGS. 5-6C. FIG. 5 is a schematic structural diagram illustrating the optical imaging system according to Example 3 of the present disclosure.

As shown in FIG. 5, the optical imaging system from an object side to an image side sequentially includes: a first lens E1, a second lens E2, a stop STO, a third lens E3, a fourth lens E4, an optical filter E5 and an imaging plane S11.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the surfaces S1 to S10 and is finally imaged on the imaging plane S11.

In this example, the total effective focal length f of the optical imaging system is 1.30 mm, a total track length TTL of the optical imaging system is 8.00 mm, half of a diagonal length ImgH of an effective pixel area on the imaging plane S11 of the optical imaging system is 1.75 mm, half of a maximum field-of-view Semi-FOV of the optical imaging system is 75.01°, and an F number Fno of the optical imaging system is 2.24.

Table 5 is a table illustrating basic parameters of the optical imaging system of Example 3, where the units for the radius of curvature, the thickness/distance and the focal length are millimeter (mm). Table 6 shows high-order coefficients applicable to each aspheric surface in Example 3, where the surface type of each aspheric surface may be defined by the formula (1) given in the above Example 1.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a convex surface, and an image-side surface S6 of the third lens is a convex surface. The fourth lens E4 has negative refractive power, an

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −1.5945 | 0.8379 | 1.55 | 56.1 | −2.19 | −6.0280 |
| S2 | Aspheric | 5.6834 | 1.2717 | | | | 6.0888 |
| S3 | Aspheric | 2.5181 | 2.4923 | 1.64 | 23.3 | 4.85 | −0.2264 |
| S4 | Aspheric | 7.9884 | 0.1280 | | | | 49.6229 |
| STO | Spherical | infinite | 0.1062 | | | | |
| S5 | Aspheric | 1.8420 | 1.0875 | 1.67 | 20.4 | 1.41 | 2.6838 |
| S6 | Aspheric | −1.0435 | 0.1000 | | | | −4.7297 |
| S7 | Aspheric | −9.8073 | 0.4760 | 1.67 | 20.4 | −2.71 | 94.8503 |
| S8 | Aspheric | 2.2584 | 0.1517 | | | | −24.7816 |
| S9 | Spherical | infinite | 0.2100 | 1.51 | 64.2 | | |
| S10 | Spherical | infinite | 1.1387 | | | | |
| S11 | Spherical | infinite | | | | | |

TABLE 6

| Surface number | A4 | A6 | A8 | A10 | A12 | A14 | A16 |
|---|---|---|---|---|---|---|---|
| S1 | 2.1195E−02 | −3.5353E−03 | 3.6625E−04 | −2.4466E−05 | 1.0262E−06 | −2.4566E−08 | 2.5531E−10 |
| S2 | 1.1389E−01 | −9.1511E−02 | 7.7708E−02 | −3.5794E−02 | 8.3594E−03 | −9.0214E−04 | 3.0371E−05 |
| S3 | −3.4162E−02 | −3.3350E−02 | 7.4517E−02 | −8.2571E−02 | 4.5589E−02 | −1.2466E−02 | 1.3552E−03 |
| S4 | −6.8834E−02 | 2.1589E−01 | −1.6393E+00 | 9.5351E+00 | −2.7033E+01 | 3.6349E+01 | −1.7511E+01 |
| S5 | −1.4746E−01 | −6.8771E−03 | −3.0083E−01 | 1.4743E+00 | −4.8339E+00 | 6.3874E+00 | −2.9307E+00 |
| S6 | −6.8263E−01 | 2.1877E+00 | −5.5787E+00 | 8.4155E+00 | −7.2011E+00 | 2.9221E+00 | −3.2599E−01 |
| S7 | −7.3385E−01 | 2.3354E+00 | −6.7478E+00 | 1.2448E+01 | −1.4818E+01 | 1.0048E+01 | −2.8071E+00 |
| S8 | −2.7916E−01 | 5.2647E−01 | −9.4616E−01 | 1.1160E+00 | −8.2116E−01 | 3.4073E−01 | −5.9597E−02 |

Figures 6A, 6B:
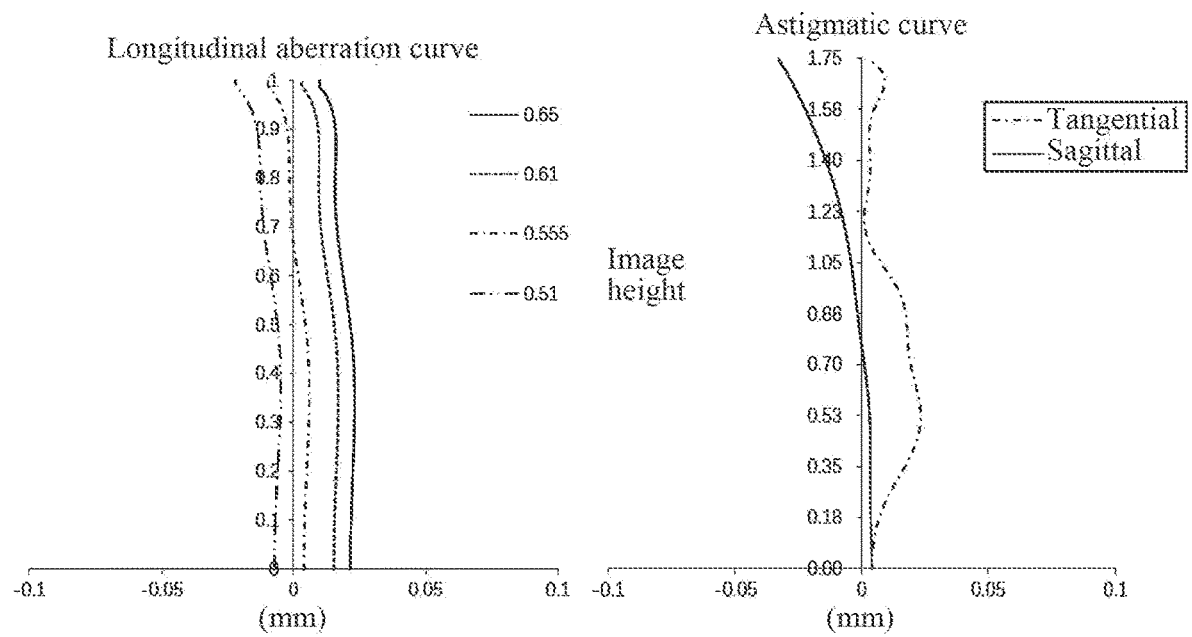
FIGS. 6A-6C respectively illustrate a longitudinal aberration curve, an astigmatic curve and a lateral color curve of the optical imaging system according to Example 3.
Figure 6C:
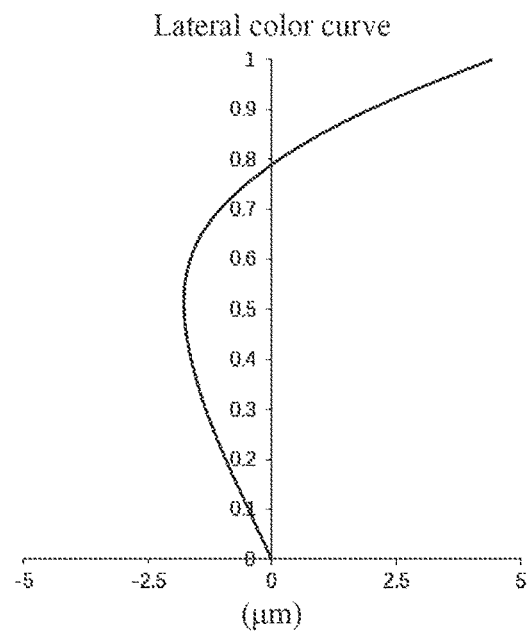

FIG. 6A illustrates the longitudinal aberration curve of the optical imaging system according to Example 3, representing deviations of focal points converged by light of different wavelengths after passing through the lens assembly. FIG. 6B illustrates the astigmatic curve of the optical imaging system according to Example 3, representing a curvature of a tangential plane and a curvature of a sagittal plane. FIG. 6C illustrates the lateral color curve of the optical imaging system according to Example 3, representing deviations of different image heights on an imaging plane after light passes through the lens assembly. It can be seen from FIG. 6A to FIG. 6C that the optical imaging system provided in Example 3 can achieve good imaging quality.

Example 4

Figure 7:
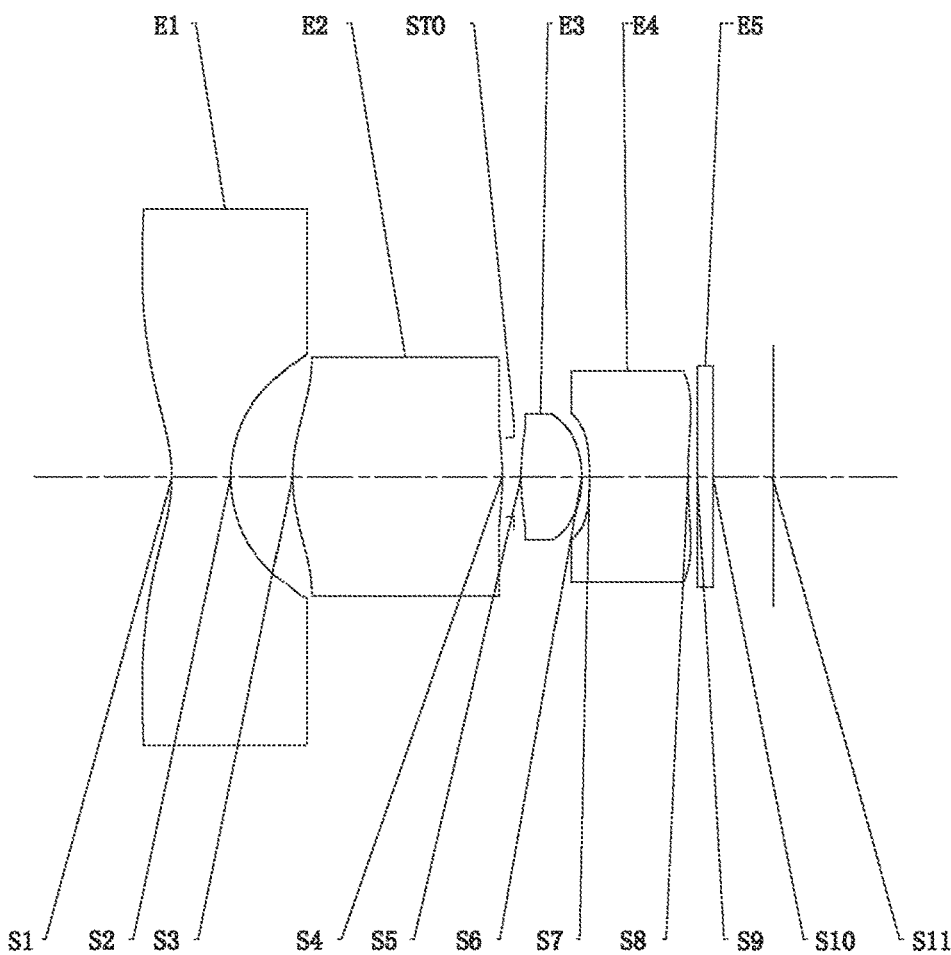
FIG. 7 is a schematic structural diagram illustrating an optical imaging system according to Example 4 of the present disclosure.

An optical imaging system according to Example 4 of the present disclosure is described below with reference to FIGS. 7-8C. FIG. 7 is a schematic structural diagram illustrating the optical imaging system according to Example 4 of the present disclosure.

As shown in FIG. 7, the optical imaging system from an object side to an image side sequentially includes: a first lens E1, a second lens E2, a stop STO, a third lens E3, a fourth lens E4, an optical filter E5 and an imaging plane S11.

object-side surface S7 of the fourth lens is a concave surface, and an image-side surface S8 of the fourth lens is a concave surface. The optical filter E5 has an object-side surface S9 and an image-side surface S10. Light from an object sequentially passes through the surfaces S1 to S10 and is finally imaged on the imaging plane S11.

In this example, the total effective focal length f of the optical imaging system is 1.30 mm, a total track length TTL of the optical imaging system is 8.00 mm, half of a diagonal length ImgH of an effective pixel area on the imaging plane S11 of the optical imaging system is 1.75 mm, half of a maximum field-of-view Semi-FOV of the optical imaging system is 74.87°, and an F number Fno of the optical imaging system is 2.24.

Table 7 is a table illustrating basic parameters of the optical imaging system of Example 4, where the units for the radius of curvature, the thickness/distance and the focal length are millimeter (mm). Table 8 shows high-order coefficients applicable to each aspheric surface in Example 4, where the surface type of each aspheric surface may be defined by the formula (1) given in the above Example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −1.9258 | 0.7850 | 1.55 | 56.1 | −1.65 | −8.2948 |
| S2 | Aspheric | 1.9365 | 0.8169 | | | | −3.9400 |
| S3 | Aspheric | 2.2453 | 2.7940 | 1.64 | 23.3 | 2.70 | 0.2859 |
| S4 | Aspheric | −3.9482 | 0.1517 | | | | −87.5786 |
| STO | Spherical | infinite | 0.1000 | | | | |
| S5 | Aspheric | 4.2232 | 0.8029 | 1.67 | 20.4 | 2.02 | 27.1594 |
| S6 | Aspheric | −1.3884 | 0.1000 | | | | 1.0315 |
| S7 | Aspheric | −5.9619 | 1.3136 | 1.67 | 20.4 | −4.05 | 44.9678 |
| S8 | Aspheric | 5.3542 | 0.1252 | | | | −6.8384 |
| S9 | Spherical | infinite | 0.2100 | 1.51 | 64.2 | | |
| S10 | Spherical | infinite | 0.8030 | | | | |
| S11 | Spherical | infinite | | | | | |

TABLE 8

| Surface number | A4 | A6 | A8 | A10 | A12 | A14 | A16 |
|---|---|---|---|---|---|---|---|
| S1 | 2.0408E−02 | −3.9462E−03 | 4.9313E−04 | −3.9100E−05 | 1.7962E−06 | −3.9087E−08 | 1.9301E−10 |
| S2 | 1.1431E−01 | −9.5581E−02 | 1.1900E−01 | −8.3934E−02 | 3.4017E−02 | −7.4643E−03 | 6.7533E−04 |
| S3 | −6.7402E−02 | −1.3818E−02 | 3.4898E−02 | −3.4340E−02 | 1.6691E−02 | −4.1568E−03 | 4.2406E−04 |
| S4 | −1.0160E−01 | 5.3513E−01 | −2.0991E+00 | 6.7115E+00 | −1.2418E+01 | 1.1296E+01 | −3.3783E+00 |
| S5 | 4.3046E−02 | −2.7838E−01 | 6.9789E−01 | −2.3502E+00 | 3.9864E+00 | −8.6522E+00 | 8.6895E+00 |
| S6 | −1.9195E−01 | 4.9787E−01 | −2.1715E−01 | −3.4438E+00 | 1.1016E+01 | −1.4513E+01 | 7.1283E+00 |
| S7 | −3.3135E−01 | 3.3525E−01 | 3.2345E−02 | −4.0066E+00 | 1.2286E+01 | −1.6848E+01 | 8.9497E+00 |
| S8 | −6.4512E−02 | 2.0001E−02 | −1.4140E−02 | 5.3812E−04 | 3.9033E−03 | −2.2652E−03 | 4.5128E−04 |

Figures 8A, 8B:
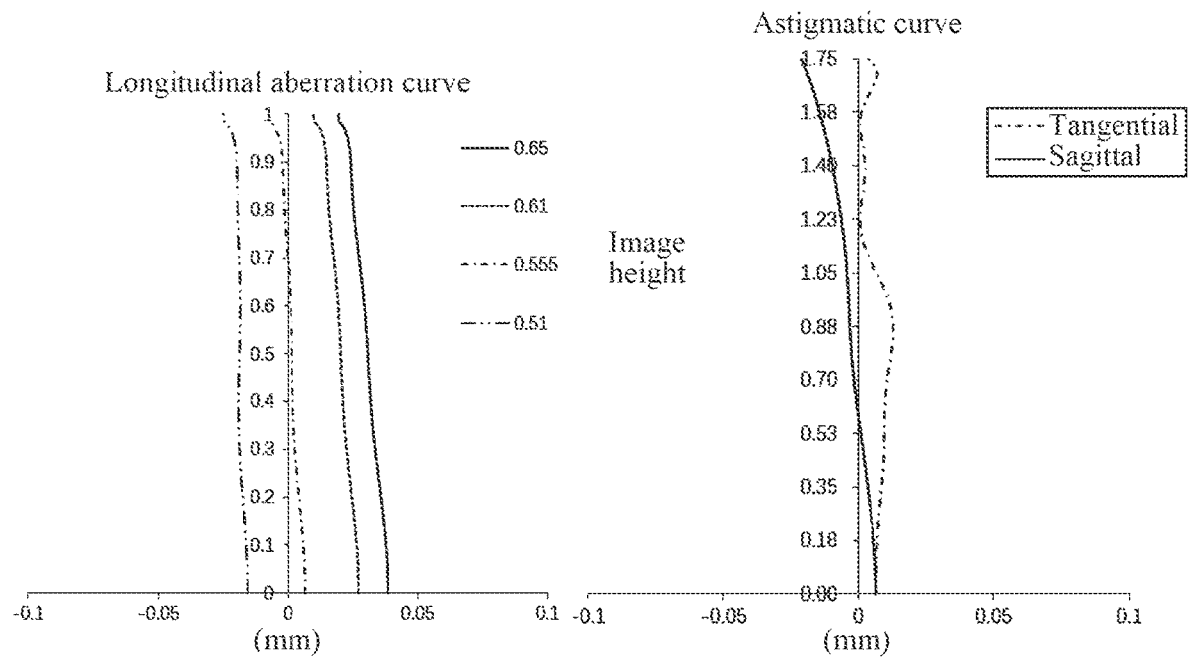
FIGS. 8A-8C respectively illustrate a longitudinal aberration curve, an astigmatic curve and a lateral color curve of the optical imaging system according to Example 4.
Figure 8C:
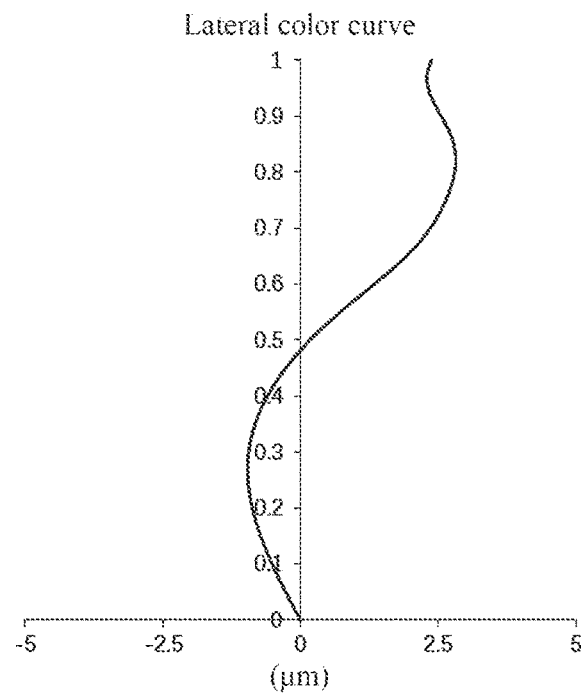

FIG. 8A illustrates the longitudinal aberration curve of the optical imaging system according to Example 4, representing deviations of focal points converged by light of different wavelengths after passing through the lens assembly. FIG. 8B illustrates the astigmatic curve of the optical imaging system according to Example 4, representing a curvature of a tangential plane and a curvature of a sagittal plane. FIG. 8C illustrates the lateral color curve of the optical imaging system according to Example 4, representing deviations of different image heights on an imaging plane after light passes through the lens assembly. It can be seen from FIG. 8A to FIG. 8C that the optical imaging system provided in Example 4 can achieve good imaging quality.

Example 5

Figure 9:
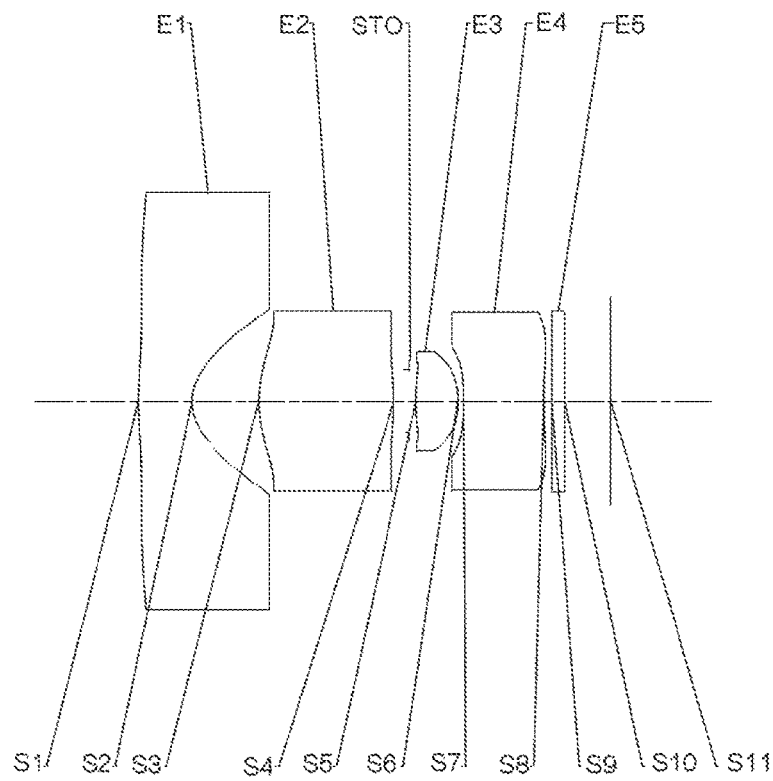
FIG. 9 is a schematic structural diagram illustrating an optical imaging system according to Example 5 of the present disclosure.

An optical imaging system according to Example 5 of the present disclosure is described below with reference to FIGS. 9-10C. FIG. 9 is a schematic structural diagram illustrating the optical imaging system according to Example 5 of the present disclosure.

9, the optical imaging system from an object side to an image side sequentially includes: a first lens E1, a second lens E2, a stop STO, a third lens E3, a fourth lens E4, an optical filter E5 and an imaging plane S11.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the surfaces S1 to S10 and is finally imaged on the imaging plane S11.

In this example, the total effective focal length f of the optical imaging system is 1.30 mm, a total track length TTL of the optical imaging system is 8.00 mm, half of a diagonal length ImgH of an effective pixel area on the imaging plane S11 of the optical imaging system is 1.75 mm, half of a maximum field-of-view Semi-FOV of the optical imaging system is 75.00°, and an F number Fno of the optical imaging system is 2.23.

Table 9 is a table illustrating basic parameters of the optical imaging system of Example 5, where the units for the radius of curvature, the thickness/distance and the focal length are millimeter (mm). Table 10 shows high-order coefficients applicable to each aspheric surface in Example 5, where the surface type of each aspheric surface may be defined by the formula (1) given in the above Example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | 5.6419 | 0.9080 | 1.55 | 56.1 | −1.67 | −90.0000 |
| S2 | Aspheric | 0.7395 | 1.1341 | | | | −1.1996 |
| S3 | Aspheric | 2.1422 | 2.2825 | 1.64 | 23.3 | 2.81 | 0.4608 |
| S4 | Aspheric | −6.8294 | 0.2734 | | | | −89.4007 |
| STO | Spherical | infinite | 0.1000 | | | | |
| S5 | Aspheric | 3.8436 | 0.7187 | 1.67 | 20.4 | 1.86 | 25.2121 |
| S6 | Aspheric | −1.2903 | 0.1000 | | | | 0.3040 |
| S7 | Aspheric | −7.7953 | 1.3487 | 1.67 | 20.4 | −4.93 | −99.9000 |
| S8 | Aspheric | 6.0706 | 0.1458 | | | | −26.0401 |
| S9 | Spherical | infinite | 0.2100 | 1.51 | 64.2 | | |
| S10 | Spherical | infinite | 0.7788 | | | | |
| S11 | Spherical | infinite | | | | | |

TABLE 10

| Surface number | A4 | A6 | A8 | A10 | A12 | A14 | A16 |
|---|---|---|---|---|---|---|---|
| S1 | −2.4965E−02 | 9.0400E−03 | −1.7355E−03 | 2.0400E−04 | −1.4638E−05 | 5.8821E−07 | −1.0135E−08 |
| S2 | −9.7968E−02 | 1.0164E−01 | −8.7100E−02 | 6.3232E−02 | −2.5336E−02 | 4.2556E−03 | −1.6285E−04 |
| S3 | −5.4027E−02 | −1.9669E−02 | 9.0163E−03 | −4.6611E−03 | −3.1767E−04 | 8.2635E−04 | −1.5424E−04 |
| S4 | −2.2445E−02 | −8.8599E−02 | 1.1608E+00 | −4.9544E+00 | 1.1393E+01 | −1.3310E+01 | 6.2941E+00 |
| S5 | −1.2399E−01 | 9.1311E−02 | −4.0441E+00 | 2.6459E+01 | −9.3095E+01 | 1.5218E+02 | −9.2917E+01 |
| S6 | −2.1934E−01 | 3.9627E−01 | 3.0183E−01 | −5.9436E+00 | 1.7068E+01 | −2.2541E+01 | 1.1413E+01 |
| S7 | −3.5911E−01 | 6.9859E−01 | −2.3814E+00 | 5.9793E+00 | −1.0005E+01 | 9.1011E+00 | −3.2362E+00 |
| S8 | −3.6608E−02 | 1.0117E−02 | −3.3774E−02 | 4.1514E−02 | −2.8859E−02 | 1.0042E−02 | −1.3522E−03 |

Figures 10A, 10B:
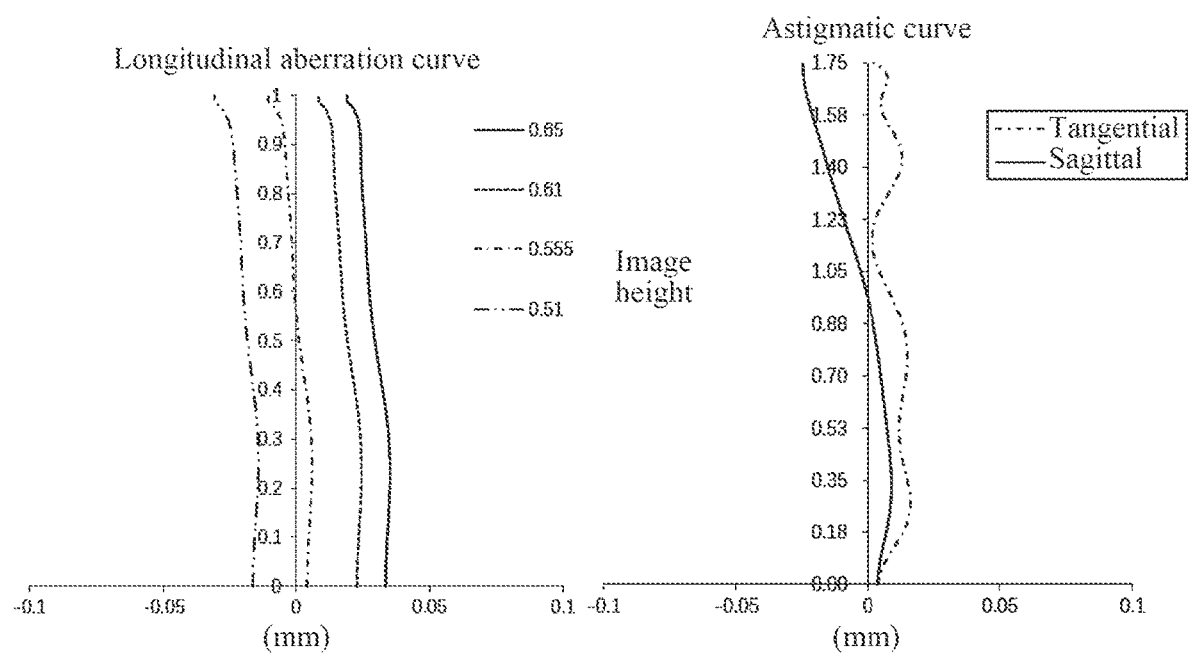
FIGS. 10A-10C respectively illustrate a longitudinal aberration curve, an astigmatic curve and a lateral color curve of the optical imaging system according to Example 5.
Figure 10C:
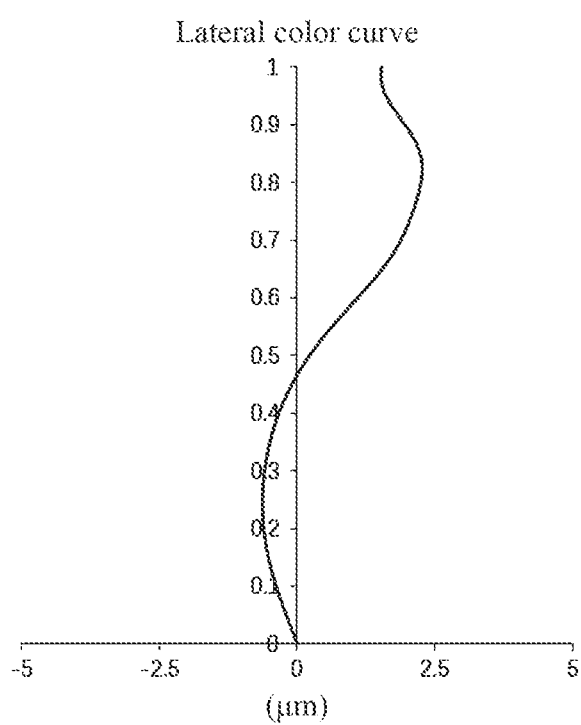

FIG. 10A illustrates the longitudinal aberration curve of the optical imaging system according to Example 5, representing deviations of focal points converged by light of different wavelengths after passing through the lens assembly. FIG. 10B illustrates the astigmatic curve of the optical imaging system according to Example 5, representing a curvature of a tangential plane and a curvature of a sagittal plane. FIG. 10C illustrates the lateral color curve of the optical imaging system according to Example 5, representing deviations of different image heights on an imaging plane after light passes through the lens assembly. It can be seen from FIG. 10A to FIG. 10C that the optical imaging system provided in Example 5 can achieve good imaging quality.

In view of the above, examples 1 to 5 respectively satisfy the relationship shown in Table 11.

TABLE 11

| | Example | | | | |
|---|---|---|---|---|---|
| Conditional | 1 | 2 | 3 | 4 | 5 |
| f/EPD | 2.20 | 2.22 | 2.24 | 2.24 | 2.23 |
| f × tan(Semi-FOV) (mm) | 4.86 | 4.79 | 4.85 | 4.81 | 4.85 |
| |(f2 + f3)/f1| | 2.54 | 3.26 | 2.85 | 2.86 | 2.80 |
| R3/f2 | 0.68 | 0.76 | 0.52 | 0.83 | 0.76 |
| CT2/CT1 | 1.24 | 1.67 | 2.97 | 3.56 | 2.51 |
| f2/f3 | 1.36 | 0.77 | 3.44 | 1.34 | 1.51 |
| R5/f3 | 4.11 | 2.38 | 1.31 | 2.10 | 2.06 |
| (CT1 + CT2 + T12)/(CT3 + CT4) | 1.31 | 3.31 | 2.94 | 2.08 | 2.09 |
| |(R6 + R7)/R8| | 3.16 | 1.94 | 4.80 | 1.37 | 1.50 |
| ΣCT/ΣAT | 2.56 | 1.68 | 3.05 | 4.87 | 3.27 |
| ET1/CT1 | 2.78 | 2.75 | 2.78 | 2.76 | 2.31 |
| f23/f123 | 1.74 | 1.24 | 2.24 | 2.07 | 1.88 |
| SAG12/CT1 | 1.63 | 1.61 | 1.22 | 1.28 | 1.45 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, along an optical axis from an object side to an image side sequentially comprising:
   a first lens having negative refractive power;
   a second lens having positive refractive power, and an object-side surface of the second lens being a convex surface;
   a third lens having refractive power, an object-side surface of the third lens at a paraxial area being a convex surface, and an image-side surface of the third lens at the paraxial area being a convex surface; and a fourth lens having refractive power, and an object-side surface of the fourth lens at the paraxial area being a concave surface, wherein a number of lenses having refractive powers in the optical imaging system is four, a total effective focal length f of the optical imaging system and half of a maximum field-of-view Semi-FOV of the optical imaging system satisfy: f×tan(Semi-FOV)≥4.0 mm; and the total effective focal length f of the optical imaging system and an entrance pupil diameter EPD of the optical imaging system satisfy: f/EPD<2.35.

2. The optical imaging system according to claim 1, wherein an effective focal length f2 of the second lens and a radius of curvature R3 of the object-side surface of the second lens satisfy: 0.5≤R3/f2≤0.9.

3. The optical imaging system according to claim 1, wherein a center thickness CT1 of the first lens on the optical axis and a center thickness CT2 of the second lens on the optical axis satisfy: 1.0≤CT2/CT1≤3.7.

4. The optical imaging system according to claim 1, wherein an effective focal length f2 of the second lens and an effective focal length f3 of the third lens satisfy: 0.5≤f2/f3≤3.5.

5. The optical imaging system according to claim 1, wherein a radius of curvature R5 of the object-side surface of the third lens and an effective focal length f3 of the third lens satisfy: 1.1≤R5/f3≤4.3.

6. The optical imaging system according to claim 1, wherein a center thickness CT1 of the first lens on the optical axis, a center thickness CT2 of the second lens on the optical axis, a center thickness CT3 of the third lens on the optical axis, a center thickness CT4 of the fourth lens on the optical axis and a spaced interval T12 between the first lens and the second lens on the optical axis satisfy: 1.2≤(CT1+CT2+T12)/(CT3+CT4)≤3.5.

7. The optical imaging system according to claim 1, wherein a radius of curvature R6 of the image-side surface of the third lens, a radius of curvature R7 of the object-side surface of the fourth lens, and a radius of curvature R8 of an image-side surface of the fourth lens satisfy: 1.0≤|(R6+R7)/R8|≤5.0.

8. The optical imaging system according to claim 1, wherein an edge thickness ET1 of the first lens and a center thickness CT1 of the first lens on the optical axis satisfy: 2.2≤ET1/CT1≤3.0.

9. The optical imaging system according to claim 1, wherein an on-axis distance SAG12 from an intersection of an image-side surface of the first lens and the optical axis to a vertex of an effective radius of the image-side surface of the first lens and a center thickness CT1 of the first lens on the optical axis satisfy: 1.2≤SAG12/CT1≤1.7.

10. The optical imaging system according to claim 1, wherein a combined focal length f23 of the second lens and the third lens and a combined focal length f123 of the first lens, the second lens and the third lens satisfy: 1.0≤f23/f123≤2.5.

11. The optical imaging system according to claim 1, wherein a sum of center thicknesses ECT of the first lens to the fourth lens on the optical axis and a sum of spaced intervals ΣAT of any two adjacent lenses on the optical axis from the first lens to the fourth lens satisfy: 1.5≤ΣCT/Σ≤5.0.

12. The optical imaging system according to claim 1, wherein an effective focal length f1 of the first lens, the effective focal length f2 of the second lens, and the effective focal length f3 of the third lens satisfy: 2.5≤|(f2+f3)/f1|≤4.0.

13. The optical imaging system according to claim 1, wherein a maximum field-of-view FOV of the optical imaging system satisfies: 140°≤FOV≤160°.

14. An optical imaging system, along an optical axis from an object side to an image side sequentially comprising:

a first lens having negative refractive power;

a second lens having positive refractive power, and an object-side surface of the second lens being a convex surface;

a third lens having refractive power, an object-side surface of the third lens at a paraxial area being a convex surface, and an image-side surface of the third lens at the paraxial area being a convex surface; and a fourth lens having refractive power, and an object-side surface of the fourth lens at the paraxial area being a concave surface, wherein of number of lenses having refractive powers in the optical imaging system is four, an effective focal length f1 of the first lens, an effective focal length f2 of the second lens, and an effective focal length f3 of the third lens satisfy: 2.5≤|(f2+f3)/f1|≤4.0; and a maximum field-of-view FOV of the optical imaging system satisfies: 140°≤FOV≤160°.

15. The optical imaging system according to claim 14, wherein the effective focal length f2 of the second lens and a radius of curvature R3 of the object-side surface of the second lens satisfy: 0.5≤R3/f2≤0.9.

16. The optical imaging system according to claim 14, wherein a center thickness CT1 of the first lens on the optical axis and a center thickness CT2 of the second lens on the optical axis satisfy: 1.0≤CT2/CT1≤3.7.

17. The optical imaging system according to claim 14, wherein the effective focal length f2 of the second lens and the effective focal length f3 of the third lens satisfy: 0.53f2/f3≤3.5.

18. The optical imaging system according to claim 14, wherein a radius of curvature R5 of the object-side surface of the third lens and the effective focal length f3 of the third lens satisfy: 1.1≤R5/f3≤4.3.

19. The optical imaging system according to claim 14, wherein a center thickness CT1 of the first lens on the optical axis, a center thickness CT2 of the second lens on the optical axis, a center thickness CT3 of the third lens on the optical axis, a center thickness CT4 of the fourth lens on the optical axis and a spaced interval T12 between the first lens and the second lens on the optical axis satisfy: 1.2≤(CT1+CT2+T12)/(CT3+CT4)≤3.5.

20. The optical imaging system according to claim 14, wherein a radius of curvature R6 of the image-side surface of the third lens, a radius of curvature R7 of the object-side surface of the fourth lens, and a radius of curvature R8 of an image-side surface of the fourth lens satisfy: 1.0≤|(R6+R7)/R8|≤5.0.

* * * * *